United States Patent
Li et al.

(10) Patent No.: US 10,198,112 B2
(45) Date of Patent: Feb. 5, 2019

(54) APPARATUS AND METHOD FOR IMPLEMENTING TOUCH FEEDBACK

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Kun Li, Beijing (CN); Jing Wang, Beijing (CN); Yifei Zhan, Beijing (CN); Tao Ma, Beijing (CN); Dayu Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 73 days.

(21) Appl. No.: 15/098,100

(22) Filed: Apr. 13, 2016

(65) Prior Publication Data
US 2017/0090646 A1   Mar. 30, 2017

(30) Foreign Application Priority Data
Sep. 25, 2015   (CN) .......................... 2015 1 0624980

(51) Int. Cl.
*G06F 3/041* (2006.01)
*G09G 5/02* (2006.01)
(Continued)

(52) U.S. Cl.
CPC ............ *G06F 3/0416* (2013.01); *G06F 3/044* (2013.01); *G06F 3/0488* (2013.01); *G09G 5/02* (2013.01);
(Continued)

(58) Field of Classification Search
CPC .......... G06F 3/041; G06F 3/045; G06F 3/033; G06F 3/02; G01R 27/26; G09G 5/08; G09G 5/00
See application file for complete search history.

(56) References Cited

U.S. PATENT DOCUMENTS

| 9,430,110 B2 * | 8/2016 | Takanohashi ........... G06F 3/044 |
| 2007/0152983 A1 * | 7/2007 | McKillop ........... G06F 3/03547 345/173 |

(Continued)

FOREIGN PATENT DOCUMENTS

| CN | 101169696 A | 4/2008 |
| CN | 101213508 A | 7/2008 |

(Continued)

OTHER PUBLICATIONS

China Third Office Action, Application No. 201510624980.7, dated Feb. 14, 2018, 13 pps.: with English translation.
(Continued)

*Primary Examiner* — Pegeman Karimi
(74) *Attorney, Agent, or Firm* — Armstrong Teasdale LLP

(57) ABSTRACT

An apparatus and a method for implementing touch feedback is provided. The method for implementing touch feedback includes determining a touch region corresponding to a touch operation in response to the touch operation on a touch display device, processing an image to be displayed based at least in part on the touch region wherein the processing includes adjusting image features of the image to be displayed in the touch region, and displaying the processed image to be displayed on the touch display device.

14 Claims, 2 Drawing Sheets

(51) Int. Cl.
*G09G 5/10* (2006.01)
*G06F 3/0488* (2013.01)
*G06F 3/044* (2006.01)

(52) U.S. Cl.
CPC ........... *G09G 5/10* (2013.01); *G09G 2320/08* (2013.01); *G09G 2340/14* (2013.01); *G09G 2354/00* (2013.01)

(56) References Cited

U.S. PATENT DOCUMENTS

| | | |
|---|---|---|
| 2008/0204427 A1 | 8/2008 | Heesemans et al. |
| 2010/0194705 A1 | 8/2010 | Kim et al. |
| 2012/0113018 A1 | 5/2012 | Yan |
| 2013/0268897 A1 | 10/2013 | Li et al. |
| 2015/0042571 A1* | 2/2015 | Lombardi .................. G06F 3/01 345/173 |
| 2015/0242712 A1* | 8/2015 | Awano .................. G06K 15/002 358/1.15 |

FOREIGN PATENT DOCUMENTS

| | | |
|---|---|---|
| CN | 101498974 A | 8/2009 |
| CN | 101794190 A | 8/2010 |
| CN | 102035934 A | 4/2011 |
| CN | 102541445 A | 7/2012 |
| CN | 103106028 A | 5/2013 |
| CN | 203909670 U | 10/2014 |
| CN | 104407798 A | 3/2015 |
| CN | 104778195 A | 7/2015 |
| CN | 104793863 A | 7/2015 |

OTHER PUBLICATIONS

China First Office Action, Application No. 201510624980.7, dated Sep. 11, 2017, 15 pps.: with English translation.

China Fourth Office Action, Application No. 201510624980.7, dated May 14, 2018, 15 pps.: with English translation.

* cited by examiner

APPARATUS AND METHOD FOR IMPLEMENTING TOUCH FEEDBACK

CROSS REFERENCE TO RELATED APPLICATIONS

This application claims priority to China patent application number 201510624980.7, which was filed on Sep. 25, 2015, the disclosure of which is incorporated by reference herein in its entirety.

BACKGROUND

An exemplary embodiment of the present disclosure generally relates to touch technologies, and particularly, to an apparatus and method for implementing touch feedback.

Interaction through a touch screen is a simple, convenient and natural human-machine interaction manner. The touch screen has been used more and more broadly. Currently, touch screens are in use on large-size display devices like electronic whiteboard, one-touch, or even a home TV with touch function. However, current touch display devices fail to provide good feedback on an operator's touch operation.

BRIEF DESCRIPTION

In a first aspect of an exemplary embodiment of the present disclosure, a method for implementing touch feedback includes: determining a touch region corresponding to a touch operation, in response to the touch operation on a touch display device; processing an image to be displayed based at least in part on the touch region, wherein said processing includes adjusting image features of the image to be displayed in the touch region; and displaying the processed image to be displayed on the touch display device.

In another aspect of an exemplary embodiment of the present disclosure, an apparatus for implementing touch feedback includes: a determination module for determining a touch region corresponding to a touch operation, in response to the touch operation on a touch display device; a processing module for processing an image to be displayed based at least in part on the touch region, wherein said processing includes adjusting image features of the image to be displayed in the touch region; and a display module for displaying the processed image to be displayed on the touch display device.

In another aspect of an exemplary embodiment of the present disclosure, an apparatus for implementing touch feedback includes: at least one processor, and at least one memory storing computer program code. The computer program code, when executed by the at least one processor, being configured to, cause the apparatus at least to perform the following operations: determining a touch region corresponding to a touch operation, in response to the touch operation on a touch display device; processing an image to be displayed based at least in part on the touch region, wherein said processing includes adjusting image features of the image to be displayed in the touch region; and displaying the processed image to be displayed on the touch display device.

In another aspect of an exemplary embodiment of the present disclosure, a method for determining the touch region corresponding to the touch operation includes: determining a touch position of the touch operation; and determining the touch region based at least in part on the touch position. The touch position may be located at least in part within the touch region. The area of the touch region may be associated with the touch strength of the touch operation. A device for sensing the touch operation includes: a capacitive sensing device, a resistive sensing device, an infrared sensing device or an acoustic sensing device.

In another aspect of an exemplary embodiment of the present disclosure, the method for adjusting the image features of the image to be displayed in the touch region include at least one of: changing image luminance within the touch region; changing image chrominance within the touch region; and displaying an image within the touch region with special effect. The image to be displayed includes a dynamic image or a static image.

In another aspect of an exemplary embodiment of the present disclosure, the method for adjusting the image features of the image to be displayed in the touch region includes: adjusting the image features of the image to be displayed within the touch region based at least in part on a predetermined criterion, wherein the predetermined criterion defines at least one parameter related to the adjustment of the image features.

In another aspect of an exemplary embodiment of the present disclosure, an image may be displayed on the touch display device without adjusting image features thereof, in response to a touch operation end instruction.

By employing the solutions described herein according to the exemplary embodiments of the present disclosure, an automatic feedback on a touch operation may be implemented, thereby improving user experiences with a touch display device.

BRIEF DESCRIPTION OF THE DRAWINGS

To more clearly illustrate the technical solutions of the embodiments of the present disclosure, the accompanying drawings of the exemplary embodiments will be briefly described below. The accompanying drawings discussed in the description hereafter are merely exemplary and illustrative, and are not intended to limit the present disclosure in any way. Those of ordinary skill in the art may also obtain other drawings according to these drawings. Various aspects of the embodiments of the present disclosure as well as further objectives and advantages thereof will be better understood by reference to the following detailed description of the illustrative embodiments, when reading in combination with the accompanying drawings.

DETAILED DESCRIPTION

Figure 1:
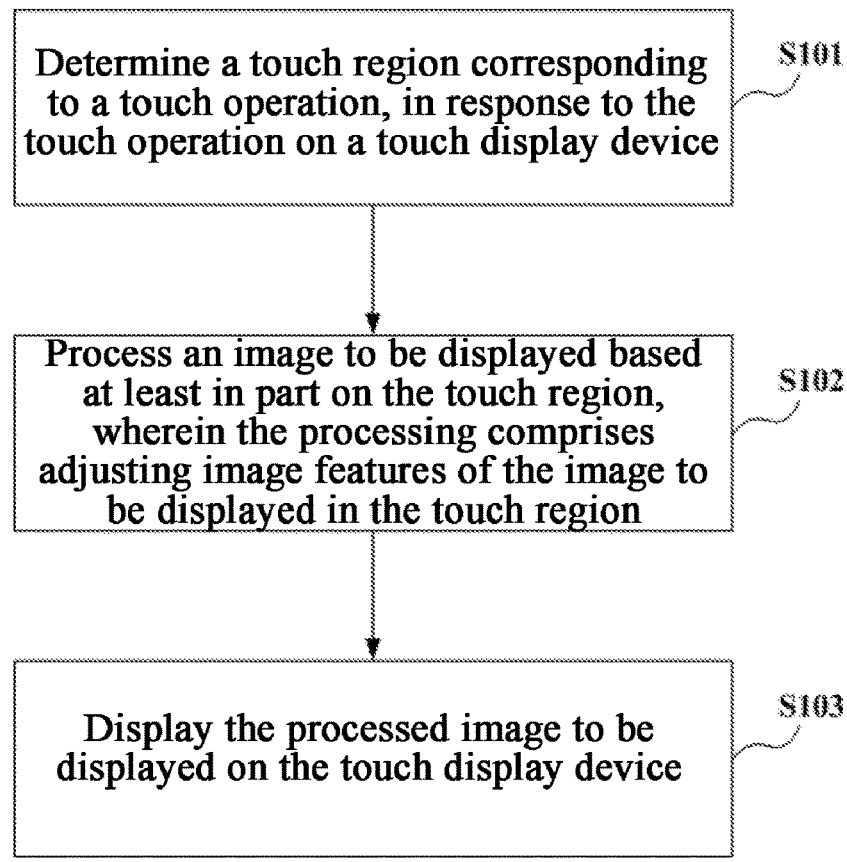
FIG. 1 shows a flowchart of a method for implementing touch feedback in accordance with an exemplary embodiment of the present disclosure.

To make the objective, technical solution and advantages of the embodiments of the present disclosure more clear, the embodiments of the present disclosure are described below in detail with reference to the accompanying drawings. The embodiments described herein are merely part of, and not all of embodiments of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions throughout this specification to features, advantages, or similar language may refer, but not necessarily, to the same embodiment. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be realized in certain embodiments that may not be present in all embodiments of the disclosure.

In accordance with the exemplary embodiments of the present disclosure, terms "touch" and "touch-control" and similar terms are used interchangeably to represent direct and/or indirect contact and/or control performed on an input device such as a display or the like. Further, when described in the description, a variety of messages, data, images, information or other communications may be sent or transmitted from a component or device to another component or device. It should be understood that the transmission of messages, data, images, information or other communications include not only the transmission of the messages, data, images, information or other communications, but also the preparation of the messages, data, images, information or other communications. Therefore, the use of any such terms should not be considered as limiting the spirit and scope of the embodiments of the present disclosure.

A touch display device may allow a user to enable operations of a host through a soft touch on an icon or text on a display screen merely by a finger, a stylus or the like, thereby getting rid of keyboard and mouse operations and making human-machine interaction more convenient. However, as touch display devices are used more and more broadly, the user demand for a feedback on a touch operation is becoming increasingly evident. A positive result may be achieved when the touch display device appropriately responds to a user's touch operation. With a feedback on a user's touch, the effect of the touch operation may be stressed and what operations are available may be indicated. For example, when a user clicks on a virtual keyboard on a touch screen, the touch display device may make sound to simulate the sound of a user's tap on an ordinary keyboard, thereby implementing a good response to the user's operation.

According to an exemplary embodiment of the present disclosure, there is provided a solution to implement touch feedback, which implements effective touch feedback by automatically adjusting image display in a touch region. This approach of providing users with a visual response to a touch operation causes human-machine interactions more intuitive and touch operations more convenient, thereby improving user experiences with comfortableness.

FIG. 1 shows a flowchart of a method for implementing touch feedback in accordance with an exemplary embodiment of the present disclosure.

The method for implementing touch feedback includes:

S101: determining a touch region corresponding to a touch operation, in response to the touch operation on a touch display device;

S102: processing an image to be displayed based at least in part on the touch region, wherein said processing an image to be displayed includes adjusting image features of the image to be displayed in the touch region;

S103: displaying the processed image to be displayed (i.e. after processing the image) on the touch display device.

The method for implementing touch feedback shown in FIG. 1 may be performed by a touch display device or by a user terminal with a touch display device. The user terminal may be any type of mobile terminal, fixed terminal or portable terminal, including mobile phone, smart phone, multimedia device, desktop computer, laptop computer, tablet computer, personal communication system device, personal navigation device, personal digital assistant, audio player, video player, digital camera, digital video recorder, positioning device, television receiver, radio broadcast receiver, e-book device, gaming device, wearable device, medical device and/or the like.

In the method described according to FIG. 1, in step S101, a terminal may determine a touch region corresponding to a touch operation, in response to the touch operation on a touch display device.

For example, a user may perform a touch operation on a touch display device through a finger, a stylus, etc. Depending on different purposes of the touch operation, the user may selectively touch different positions on the touch display device, and the touch display device may sense the user's touches on different positions by using a touch-sensing device based on a particular sensing principle. According to an exemplary embodiment of the present disclosure, a device on the terminal to sense a touch operation may include a capacitive sensing device, a resistive sensing device, an infrared sensing device or an acoustic sensing device.

Figure 2:
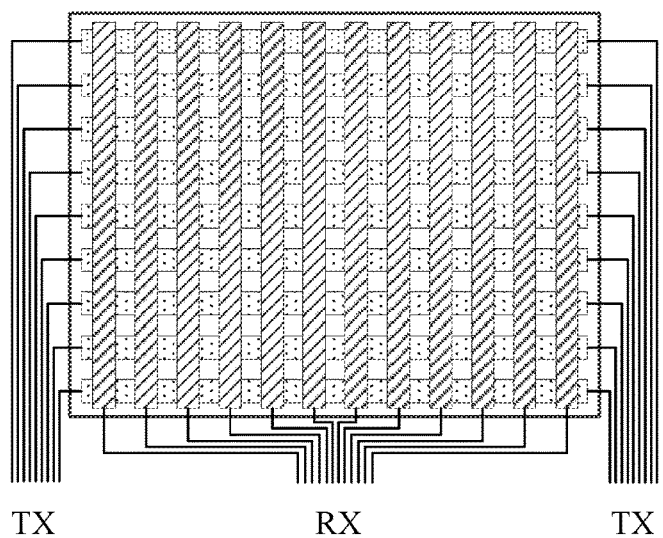
FIG. 2 is a schematic principle diagram of a touch screen in accordance with an exemplary embodiment of the present disclosure.

FIG. 2 is a schematic principle diagram of a touch screen in accordance with an exemplary embodiment of the present disclosure. It will be appreciated that the capacitive sensing principle, the resistive sensing principle, the infrared sensing principle or the acoustic sensing principle may be applied to the touch screen of a touch display device. Currently an OGS (One Glass Solution) touch screen mainly adopts the capacitive sensing principle. The capacitive sensing principle includes the self-capacitive sensing principle and the mutual-capacitive sensing principle, and the mutual-capacitive sensing principle can implement multi-point recognition and becomes the mainstream. In the mutual-capacitive OGS touch screen principle as shown in FIG. 2, the coupling capacitance is formed between intercrossed electrodes on the touch screen, and TX (transmitter) transmits a drive signal while RX (receiver) receives a sensing signal. When a user touches a certain position on the panel (for example, by a finger), there is capacitance between the user's finger and electrodes of the touch screen because of the human electric field, thus the sensing signal received by RX will change, whereby the touch position of the finger may be located.

For a touch screen adopting the resistive sensing principle, when a user's finger touches the screen, the resistance will change and generate a corresponding signal, whereby the contact may be detected and the touch position of the finger may be calculated. Similarly, when an infrared sensing device or an acoustic sensing device is applied to a touch display device, a user's touch operation may be detected in accordance with the corresponding sensing principle, and the touch position of the touch operation on the touch display device may be calculated.

According to an exemplary embodiment of the present disclosure, determining the touch region corresponding to the touch operation in step S101 may include: determining a touch position of the touch operation; and determining the touch region based at least in part on the touch position. Particularly, the touch position may be located at least in part within the touch region. For example, the touch position of the touch operation may be a point (for example, which may be marked by the coordinates (x, y) of this point), a plurality of points (for example, which may be marked by the geometric center coordinates (xc, yc) of the plurality of points), or a region with a particular area (for example, which may be marked by the area m of the region). Accordingly, the touch region may be a particular region surrounding the touch position.

According to an exemplary embodiment of the present disclosure, when determining the touch region of the touch operation, the area of the touch region may be associated with the touch strength of the touch operation. For example, when the touch position is a reported position marked by the coordinates (x, y), the touch region may be a circular region centered at the reported position. The radius of the circular region may be determined according to the touch strength of the touch operation or predetermined. According to an exemplary embodiment of the present disclosure, a piezo-electric sensor may be added in the peripherals of the touch display device to convert the touch strength into an electrical signal and determine the area of the touch region according to the touch strength. For example, the greater the touch strength is, the greater the area of the touch region is. It may be appreciated that the shape of the touch region is not limited to a circular shape, but may also have other shapes such as elliptical, rectangular, square, star shapes, etc.

Referring back to FIG. 1, in step S102, an image to be displayed may be processed based at least in part on the touch region, and said processing may include adjusting image features of the image to be displayed in the touch region. According to an exemplary embodiment of the present disclosure, the image to be displayed may include a dynamic image or a static image. In fact, according to the display principle, it can be seen that even if a static image or a still image is shown, such image is constantly refreshed in the background, thus for the touch display device according to embodiments of the present disclosure, a similar or the same display processing may be performed on the dynamic image and the static image. For example, a static image may be processed as a dynamic image, each frame of the dynamic image having the same image content. The image may be processed at the refresh frequency of 60 HZ, 120 HZ or the like. In an example with the refresh frequency of 60 HZ, the duration of one frame of an image is 0.0167 s (the duration of one frame of an image is reduced a half with the refresh frequency of 120 HZ), which is much lower than the human eye's reaction time.

According to an exemplary embodiment of the present disclosure, adjusting the image features of the image to be displayed in the touch region may include at least one of: changing image luminance within the touch region; changing image chrominance within the touch region; and displaying an image within the touch region with special effect. The image to be displayed may start from the next frame of an image displayed on the touch display device when the touch operation being performed is sensed. For example, a visual feedback on the touch operation may be implemented by increasing or decreasing image luminance of the image to be displayed within the touch region, by increasing or decreasing image chrominance of the image to be displayed within the touch region, and by displaying the part of the image to be displayed within the image region with special effect (for example, applying a special effect design like halo or animation), thereby making human-machine interactions more direct and facilitating to improve convenience of user operations.

According to an exemplary embodiment of the present disclosure, adjusting the image features of the image to be displayed in the touch region may include adjusting the image features of the image to be displayed within the touch region based at least in part on a predetermined criterion which defines at least one parameter related to the adjustment of the image features. A suitable criterion may be pre-defined with respect to the adjustment of the image features, and the criterion may be set by default or selected by a user. The predetermined criterion may define how to adjust the image features by setting the at least one parameter. The at least one parameter may include an amount of change of image luminance, an amount of change of image chrominance and/or an indicator of the type of the used special effect. For example, in response to determining the touch region corresponding to the touch operation, the image luminance of the image to be displayed in the image region may be increased by 10% on the basis of existing image luminance according to a predetermined criterion, so as to facilitate the recognition by the human eye. The at least one parameter may further include a threshold of the image luminance and/or a threshold of the image chrominance and the like. For example, if the current luminance of the touch screen of the touch display device is very high, for example, it has already exceeded the preset image luminance threshold, then a touch feedback may be implemented by changing brightening the touch region by 10% to darkening the touch region by 10%.

In step S103 shown in FIG. 1, the processed image to be displayed may be displayed on the touch display device. It may be appreciated that, since the displayed image is an image processed partially, the user performing the touch operation may intuitively feel the response given by the touch display device to the touch operation, and may get an encouragement, to some extent, on continuing to perform subsequent operations. According to an exemplary embodiment of the present disclosure, the method shown in FIG. 1 may further include: displaying an image on the touch display device without adjusting image features thereof, in response to a touch operation end instruction. In this case, the image to be displayed with the adjusted image features may end at the next frame of an image displayed on the touch display device when the touch operation being completed is sensed. Thus, the touch display device will continue to display the subsequent image without changing its original image features. Accordingly, the user feels once again visually the feedback given by the touch display device to the end of the touch operation, thereby improving the user's experience and making it more pleasant to use.

Figure 3:
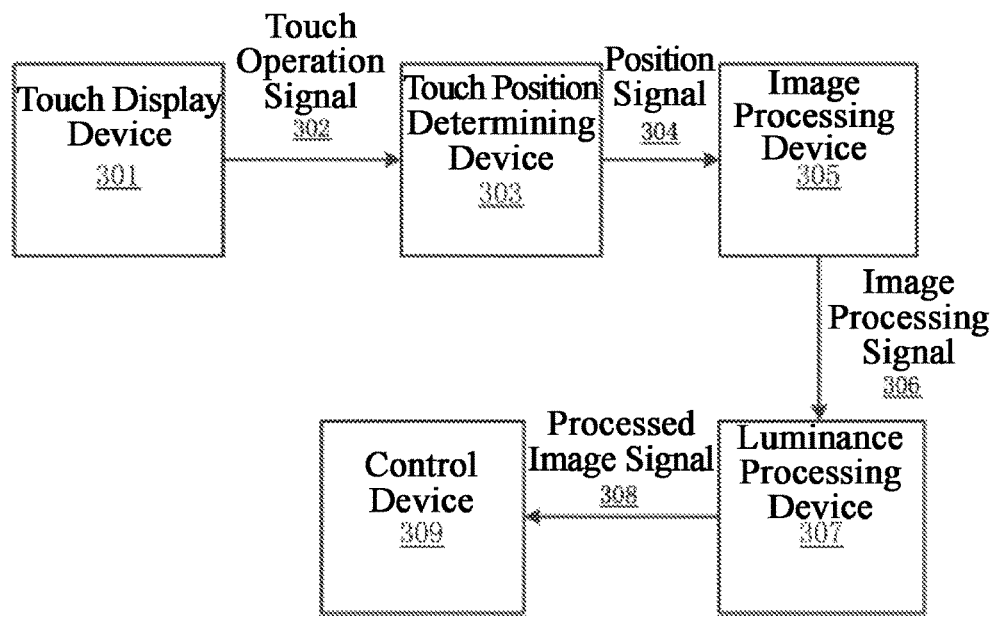
FIG. 3 shows a schematic principle diagram of automatically adjusting luminance of a touch region of a touch device in accordance with an exemplary embodiment of the present disclosure.

FIG. 3 shows a schematic principle diagram of automatically adjusting luminance of a touch region of a touch device in accordance with an exemplary embodiment of the present disclosure. As shown in FIG. 3, a touch display device 301 in accordance with an exemplary embodiment of the present disclosure may automatically adjust luminance of the touch region in response to a user's touch operation. It should be appreciated that the exemplary embodiments of the present disclosure is not limited to implementing a touch feedback by automatically adjusting luminance of the touch region, but may implement an intuitive feedback on the touch operation by automatically adjusting image features of an image in the touch region, such as luminance, chrominance and/or special effect, as the solution described in connection with FIG. 1.

When an object such as a finger, a stylus or the like, which may perform a touch operation, conducts a touch operation on the touch screen of the touch display device 301, a touch sensing device may sense the touch operation, for example the capacitance at the corresponding position on the touch screen will change (as shown in FIG. 2). A touch position determining device 303 such as a touch chip or a touch integrated circuit (Touch IC) may calculate the position of the touch operation according to a touch operation signal 302. A position signal 304 may be transmitted to a corresponding image processing device 305 (such as a video card in the integrated system). As an example, the image processing device 305 may process the next frame of an image to be displayed, for example, sending an image processing signal 306 to a luminance processing device 307 which increases luminance of the touch region in the original image corresponding to the touch operation. Then, a processed image signal 308 may be transmitted to a control device 309 such as a timing controller (TCON), in order to increase display luminance of the touch region of the touch screen. This solution may make the touch operation of the operator more intuitive and human-machine interactions more direct, thereby improving the user's experience and making it more pleasant to use. According to an exemplary embodiment of the present disclosure, if the touch display device 301 is not subject to a touch operation or the touch sensing device sense the end of a touch operation, it is not necessary to perform such image features adjustment process as brightening the touch region, but to normally display the image on the touch display device 301.

Figure 4:
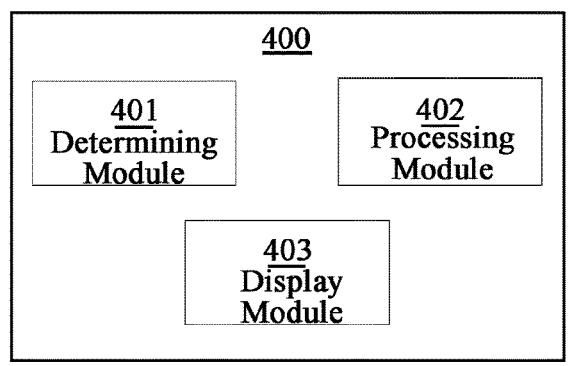
FIG. 4 shows a schematic diagram of an apparatus for implementing touch feedback in accordance with some exemplary embodiments of the present disclosure.

FIG. 4 shows a schematic diagram of an apparatus 400 for implementing touch feedback in accordance with an exemplary embodiment of the present disclosure. The apparatus 400 may be deployed or designed as a touch display device, or the apparatus 400 may be deployed or integrated into a touch display device, to implement touch feedback according to the exemplary embodiment of the present disclosure. As shown in FIG. 4, the apparatus 400 may include a determining module 401, a processing module 402 and a display module 403. According to the exemplary embodiment of the present disclosure, the determining module 401 may be used to determine a touch region corresponding to a touch operation, in response to the touch operation on the touch display device. The processing module 402 may be used to process an image to be displayed based at least in part on the touch region, wherein said processing may include adjusting image features of the image to be displayed in the touch region. The display module 403 may be used to display the processed image to be displayed on the touch display device. In particular, the display module 403 may further be used to display an image on the touch display device without adjusting image features thereof, in response to a touch operation end instruction.

It may be understood that the modules of the apparatus 400 shown in FIG. 4 may be added, deleted, replaced, combined and/or split in order to implement process steps and/or functions as shown in combination with FIG. 1. For example, the determining module 401 may determine the touch position of the touch operation independently or by means of one or more sub-modules, and determine the corresponding touch region based at least in part on the touch position. The processing module 402 may adjust the image features of the image to be displayed in the touch region independently or by means of one or more sub-modules, by changing image luminance in the touch region, changing image chrominance in the touch region and/or displaying the image in the touch region with special effect. Alternatively or additionally, the processing module 402 may adjust, independently or by means of one or more sub-modules, the image features of the image to be displayed in the touch region based at least in part on a predetermined criterion which may define at least one parameter related to the adjustment of the image features, such as a threshold of image luminance and/or chrominance, an amount of change of image luminance and/or chrominance, an indicator of the type of the used special effect and/or similar parameter.

Figure 5:
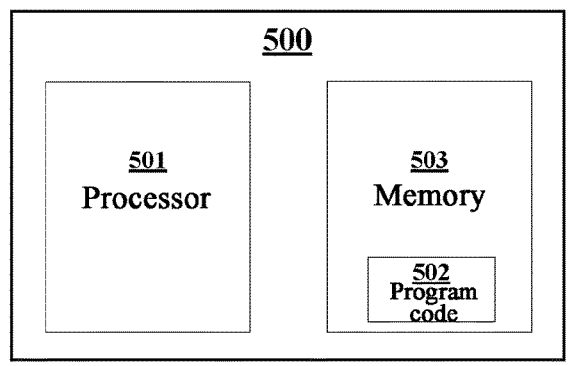
FIG. 5 shows a schematic diagram of an apparatus for implementing touch feedback in accordance with at least one exemplary embodiment of the present disclosure.

FIG. 5 shows a schematic diagram of an apparatus 500 for implementing touch feedback in accordance with another exemplary embodiment of the present disclosure. The apparatus 500 may be deployed or designed as a touch display device, or the apparatus 500 may be deployed or integrated into a touch display device, to implement touch feedback according to the exemplary embodiment of the present disclosure. As shown in FIG. 5, the apparatus 500 may include: at least one processor 501, and at least one memory 503 including computer program code 502. The at least one memory 503 and the computer program code 502 may be configured to, when executed by the at least one processor 501, cause the apparatus 500 to perform process steps and/or functions described in combination with FIG. 1. For example, the processor 501 may communicate with the memory 503 via a bus for passing information between components of the apparatus 500. The memory 503 for example may include volatile and/or nonvolatile memory. The memory 503 may be configured to store information, data, contents, applications, instructions or the like for enabling the apparatus 500 to carry out various functions according to exemplary embodiments of the present disclosure.

The processor 501 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an Application Specific Integrated Circuit (ASIC), an Field Programmable Gate Array (FPGA), a Microcontroller Unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an exemplary embodiment, the processor 501 may be configured to execute instructions stored in the memory 503 or otherwise accessible to the processor 501. Alternatively or additionally, the processor may be configured to execute hard coded functionality. As such, whether configured by hardware or software methods, or by a combination thereof, the processor may represent an entity (for example, physically embodied in circuitry) capable of performing operations according to an exemplary embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the methods and/or operations described herein when the instructions are executed. The processor may include, among other things, a clock, an Arithmetic Logic Unit (ALU) and logic gates configured to support operation of the processor.

It will be understood that each block of the flowcharts, and combinations of blocks in the flowcharts, may be implemented by various means (such as hardware, firmware, processor, circuitry and/or other device associated with execution of software including one or more computer program instructions). For example, one or more of the procedures described above may be embodied by computer program instructions. In this regard, the computer program instructions which embody the procedures described above may be stored by the memory 503 of the apparatus 500 employing an exemplary embodiment of the present disclosure and executed by the processor 501 of the apparatus 500. As will be appreciated, any such computer program instructions may be loaded onto a computer or other programmable apparatus (for example, hardware) to produce a machine, such that the resulting computer or other programmable apparatus provides for implementation of the functions specified in the flowchart block(s). These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions. In some embodiments, certain ones of the above operations may be modified or further amplified. Moreover, in some embodiments additional optional operations may also be included. The modification, addition or amplification of the above operations may be implemented in any order and in any combination thereof.

Many modifications and other embodiments of the disclosure set forth herein will come to mind to one skilled in the art to which the disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

What is claimed is:

1. A method for implementing touch feedback, comprising:
    determining a touch region corresponding to a touch operation, in response to the touch operation on a touch display device;
    processing an image to be displayed during the touch operation based at least in part on the touch region, wherein said processing comprises adjusting image features of the image to be displayed in the touch region;
    displaying, during the touch operation, the processed image to be displayed on the touch display device; and
    displaying an image on the touch display device without adjusting image features thereof, in response to a touch operation end instruction for the touch operation, wherein the touch operation end instruction indicates that the touch operation is not performed on the touch display device.

2. The method according to claim 1, wherein adjusting the image features of the image to be displayed in the touch region comprises at least one of:
    changing image luminance within the touch region;
    changing image chrominance within the touch region; and
    displaying an image within the touch region with special effect.

3. The method according to claim 1, wherein adjusting the image features of the image to be displayed in the touch region comprises:
    adjusting the image features of the image to be displayed within the touch region based at least in part on a predetermined criterion, wherein the predetermined criterion defines at least one parameter related to the adjustment of the image features.

4. The method according to claim 1, wherein determining the touch region corresponding to the touch operation comprises:
    determining a touch position of the touch operation; and
    determining the touch region based at least in part on the touch position.

5. The method according to claim 1, wherein adjusting the image features of the image to be displayed in the touch region comprises at least one of:
    changing image luminance within the touch region;
    changing image chrominance within the touch region; and
    displaying an image within the touch region with special effect.

6. The method according to claim 1, wherein adjusting the image features of the image to be displayed in the touch region comprises:
    adjusting the image features of the image to be displayed within the touch region based at least in part on a predetermined criterion, wherein the predetermined criterion defines at least one parameter related to the adjustment of the image features.

7. The method according to claim 1, wherein determining the touch region corresponding to the touch operation comprises:
    determining a touch position of the touch operation; and
    determining the touch region based at least in part on the touch position.

8. An apparatus for implementing touch feedback, comprising at least one processor and at least one memory storing computer executable instructions, wherein when executed by the at least one processor, the computer-executable instructions cause the apparatus to perform at least the following operations:

determining a touch region corresponding to a touch operation, in response to the touch operation on a touch display device;

processing an image to be displayed during the touch operation based at least in part on the touch region, wherein said processing comprises adjusting image features of the image to be displayed in the touch region;

displaying, during the touch operation, the processed image to be displayed on the touch display device; and displaying an image on the touch display device without adjusting image features thereof, in response to a touch operation end instruction for the touch operation, wherein the touch operation end instruction indicates that the touch operation is not performed on the touch display device.

9. The apparatus according to claim 8, wherein when executed by the at least one processor, the computer executable instructions cause the apparatus to adjust the image features of the image to be displayed in the touch region by performing at least one of:

changing image luminance within the touch region;

changing image chrominance within the touch region; and displaying an image within the touch region with special effect.

10. The apparatus according to claim 8, wherein when executed by the at least one processor, the computer executable instructions cause the apparatus to adjust the image features of the image to be displayed in the touch region by:

adjusting the image features of the image to be displayed within the touch region based at least in part on a predetermined criterion, wherein the predetermined criterion defines at least one parameter related to the adjustment of the image features.

11. The apparatus according to claim 8, wherein when executed by the at least one processor, the computer executable instructions cause the apparatus to determine the touch region corresponding to the touch operation by:

determining a touch position of the touch operation; and determining the touch region based at least in part on the touch position.

12. The apparatus according to claim 8, wherein when executed by the at least one processor, the computer executable instructions cause the apparatus to adjust the image features of the image to be displayed in the touch region by performing at least one of:

changing image luminance within the touch region;

changing image chrominance within the touch region; and displaying an image within the touch region with special effect.

13. The apparatus according to claim 8, wherein when executed by the at least one processor, the computer executable instructions cause the apparatus to adjust the image features of the image to be displayed in the touch region by:

adjusting the image features of the image to be displayed within the touch region based at least in part on a predetermined criterion, wherein the predetermined criterion defines at least one parameter related to the adjustment of the image features.

14. The apparatus according to claim 8, wherein when executed by the at least one processor, the computer executable instructions cause the apparatus to determine the touch region corresponding to the touch operation by:

determining a touch position of the touch operation; and determining the touch region based at least in part on the touch position.

* * * * *